(12) United States Patent
Telly

(10) Patent No.: US 8,146,290 B1
(45) Date of Patent: Apr. 3, 2012

(54) INSECT TRAPPING DEVICE

(76) Inventor: Reginald O. Telly, Sterling Heights, MI (US)

( * ) Notice: Subject to any disclaimer, the term of this patent is extended or adjusted under 35 U.S.C. 154(b) by 0 days.

(21) Appl. No.: 13/161,565

(22) Filed: Jun. 16, 2011

(51) Int. Cl.
  *A01M 1/20* (2006.01)
(52) U.S. Cl. .......................................... 43/123; 43/121
(58) Field of Classification Search .................. 43/123, 43/121, 107, 122, 132.1
  See application file for complete search history.

(56) References Cited

U.S. PATENT DOCUMENTS

| | | | | |
|---|---|---|---|---|
| 481,270 | A | * | 8/1892 | Baggesen ...................... 43/123 |
| 844,919 | A | * | 2/1907 | Brundin ........................ 43/123 |
| 1,108,870 | A | * | 8/1914 | Arnold .......................... 43/115 |
| 1,581,410 | A | | 4/1926 | Welsh |
| 2,796,696 | A | * | 6/1957 | Kea ............................... 43/121 |
| 3,304,646 | A | | 2/1967 | Staley |
| 3,708,908 | A | | 1/1973 | Levey |
| 3,913,259 | A | * | 10/1975 | Nishimura et al. ............ 43/114 |
| 4,031,654 | A | | 6/1977 | Gray |
| 4,395,842 | A | | 8/1983 | Margulies |
| 4,709,504 | A | * | 12/1987 | Andric .......................... 43/114 |
| 4,998,376 | A | | 3/1991 | Scherabak |
| 5,042,194 | A | | 8/1991 | Cohen |
| 5,090,153 | A | | 2/1992 | Mullen et al. |
| 5,253,450 | A | | 10/1993 | Muramatsu |
| 5,258,176 | A | | 11/1993 | Keenan |
| 5,713,153 | A | | 2/1998 | Cook et al. |
| 5,987,810 | A | | 11/1999 | Nash |
| 6,516,559 | B1 | | 2/2003 | Simchoni et al. |
| 6,625,922 | B1 | | 9/2003 | Ernsberger, IV |
| 6,886,292 | B2 | | 5/2005 | Studer et al. |
| 7,293,388 | B2 | | 11/2007 | DeYoreo et al. |
| 7,343,710 | B2 | * | 3/2008 | Metcalfe ........................ 43/121 |
| 7,591,099 | B2 | | 9/2009 | Lang et al. |
| 2003/0208952 | A1 | | 11/2003 | Dible |
| 2003/0233784 | A1 | | 12/2003 | Feldhege et al. |
| 2006/0179708 | A1 | | 8/2006 | Garland |
| 2007/0044372 | A1 | | 3/2007 | Lang et al. |
| 2008/0148624 | A1 | | 6/2008 | Borth et al. |
| 2008/0168703 | A1 | | 7/2008 | Siljander et al. |
| 2009/0145019 | A1 | | 6/2009 | Nolen et al. |
| 2009/0145020 | A1 | | 6/2009 | McKnight |
| 2009/0260276 | A1 | | 10/2009 | Kirsch et al. |
| 2010/0043274 | A1 | | 2/2010 | Battick |
| 2011/0041385 | A1 | * | 2/2011 | Faham et al. .................. 43/123 |

FOREIGN PATENT DOCUMENTS

| WO | 2007027601 A2 | 3/2007 |
|---|---|---|
| WO | 2008051501 A2 | 5/2008 |

* cited by examiner

*Primary Examiner* — Christopher P Ellis
(74) *Attorney, Agent, or Firm* — VanOphem & VanOphem, PC

(57) ABSTRACT

The invention is a trap for bedbugs, in the form of a double-ply pouch having its periphery sealed to create a compartment for containing an attractant. A slit opening is made in the top layer and a tubular funnel-shaped member is inserted in the slit opening to create an access opening for the bedbugs to enter into the sealed compartment.

8 Claims, 2 Drawing Sheets

Figure 3:
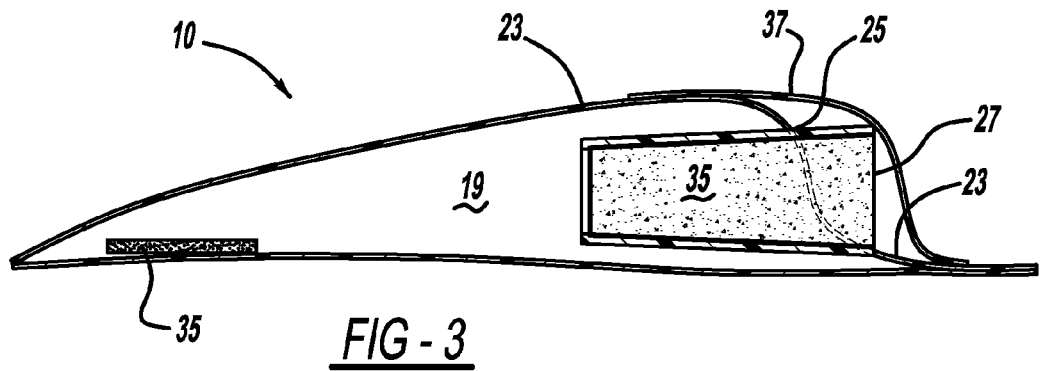

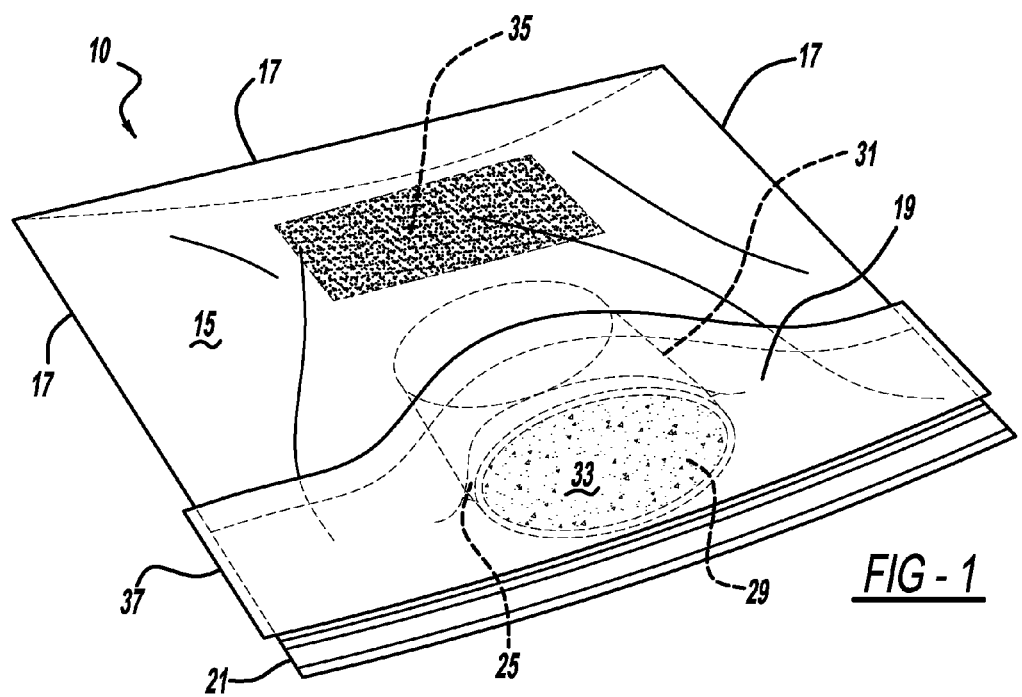
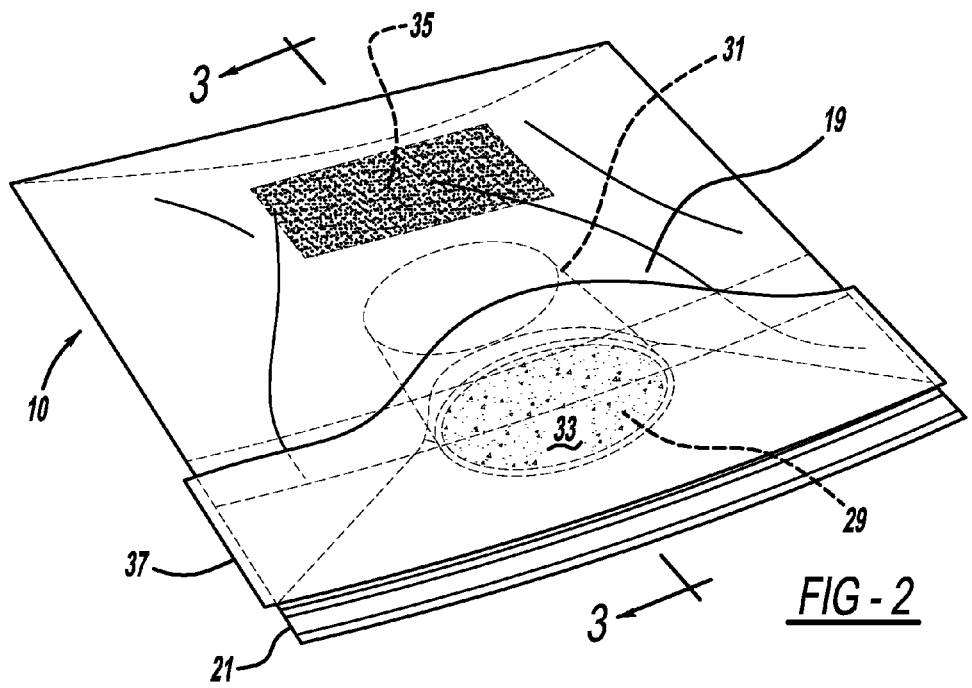

INSECT TRAPPING DEVICE

CROSS-REFERENCE TO RELATED APPLICATIONS

Not applicable.

STATEMENT REGARDING FEDERALLY SPONSORED RESEARCH

Not applicable.

REFERENCE TO SEQUENCE LISTING

Not applicable.

BACKGROUND OF THE INVENTION

The present invention generally relates to an apparatus for preventing pests such as bedbugs from infiltrating mattresses.

Bedbugs are small nocturnal insects that feed on human blood. Bedbugs have become well adapted to the human environment and therefore their detection and control is difficult and time consuming. Over the past 40-60 years, because the prevalent use of DDT sprays, the United States and Europe experienced a continuous decline in bedbug infestations resulting in relatively good control of bedbugs in these areas. However, it is believed that the increase of international travel in recent decades has contributed to a resurgence of these pests in the United States.

Adult bedbugs have flat rusty-brown colored bodies that are oval in shape. They are big enough to be easily seen (approximately ¼ inch long) but often hide in cracks in furniture, floors, walls, and countless other places. There are many aspects of bedbugs which make it difficult to eradicate them once they have established a presence in a location. The immature nymphs are similar in appearance to the adult but smaller and lighter in color. Bedbugs can move very quickly over large surfaces. Female bedbugs lay their eggs in secluded areas and can deposit up to five eggs per day, and as many as five hundred during a lifetime. When first laid, the eggs are very sticky causing them to adhere to surfaces.

Bedbugs can go for long periods of time without feeding. Nymphs can survive for weeks without feeding and the adults can survive for months. Consequently, infestations cannot be eliminated simply by leaving a location unoccupied for brief periods of time. Also, their feeding habits make it difficult to monitor whether bedbugs are present as they may only be attracted to bait when hungry. Thus, in order to be effective, a bedbug trap must be able to generate attractants at an effective concentration for an extended period of time.

Even though bedbugs feed on human blood; most victims likely will not feel the bite. After the bite, the person often experiences an itchy welt or swelling in the area of the bite. However, some persons do not have any reaction or only a very small reaction to a bedbug bite. Bedbug bites have symptoms that are similar to other insect bites such as mosquitoes and ticks. It is not possible to determine whether the bite is from a bedbug or another type of insect without actually witnessing the bedbug. As a result, bedbug infestations may go long periods without being detected. New infestations generally originate by a bedbug being carried into a new area because bedbugs are able to cling to possessions as well as hide in small spaces they can easily be transported in a traveler's belongings. As a result, buildings or structures where turnover of occupants is high, such as resorts, hotels, apartments, motels, bed and breakfasts, college dormitories, and cruise ships are especially vulnerable to bedbug infestations.

Because of all of the features of bedbugs set forth hereinabove, bedbugs are difficult to eradicate. Professional pest removal specialists and pesticides are required. It is necessary to remove all clutter and unnecessary objects from a room and apply pesticides to likely hiding areas. Most professionals claim that it takes several treatments in order to be fully rid of the infestation. Without being fully rid of the infestation, the bedbugs will just lay more eggs and continue to re-infest the home or building structure. This type of treatment for eradication is costly to a homeowner and a business as well as can be very disruptive to a business such as a hotel or motel.

Several devices for treatment of bedbug infestations are known. For example, U.S. Patent Application Publication No. 2007/0044372 to Lang et al., published on Mar. 1, 2007, discloses a bedbug monitoring device that attracts bedbugs, and retains the bedbugs or records their passage through the trap using an adhesive on a substrate. However, this device is intended to monitor the presence or absence of bedbugs, and does not provide a means for abating the presence of bedbugs.

U.S. Patent Application Publication No. 2008/0148624 to Borth et al., published on Jun. 26, 2008, discloses a bedbug monitoring device that detects chemicals (e.g., nitrophorin) that are indicative of the presence of bedbugs.

A suitcase-sized device for monitoring the presence or absence of bedbugs was disclosed by Cimex Science. The device includes a carbon dioxide canister and a heating device to monitor the presence or absence of bedbugs.

U.S. Patent Application Publication No. 2008/0168703 A1 to Siljander et al., published Jul. 17, 2008, discloses a chemical formulation which is capable of attracting bedbugs when volatized wherein the formulation contains a complex mixture of two monoterpenes, two saturate aldehydes, three unsaturated aldehydes, one aromatic aldehyde, one aromatic alcohol and a ketone.

An international application published May 2, 2008 under the Patent Cooperation Treaty, WO 2008/051501 A2 to Borth et al., discloses bedbug detection, monitoring, and control techniques which include attractants to lure bedbugs to a location in which the attractants include any combination of one or more of avian or mammalian pheromones, hormones, sweat, epidermic oils, choline and other body odors.

An international application published Mar. 8, 2007 under the Patent Cooperation Treaty, WO 2007/027601 A2 to Lang et al., discloses components of breath, perspiration and hair or skin oil as bedbug olfactory attractants.

What is needed therefore is a detection device which traps bedbugs and is attractive to bedbugs, easy to handle, simple to use, less costly, and deployable across a wide range of areas particularly in hotels and other lodging locations that experience frequent turnover of occupants.

SUMMARY OF THE INVENTION

In accordance with the invention, there is provided a bedbug capturing device that can be placed on or adjacent furniture such as sofas, chairs, beds, etc. as well as other objects to intercept crawling insects and particularly bedbugs. A particularly illustrative embodiment of the invention provides a capturing device which is adapted to be placed between the sheets of bedding covers on a mattress and trap the bedbugs within the trap made of two layers of resilient plastic material which are sealed to each other about the periphery thereof. The top layer has a partial slit therein constituting an opening to the interior of the double layer of resilient plastic. Sealingly mounted into the partial slit opening is a tubular member, which for purposes of the preferred embodiment is oval in cross-section and funnel-shaped or tapered. The tubular member is mounted into the slit opening so as to create a seal with the plastic layer surrounding the outer periphery of the tubular member. The inner surface of the tubular member is textured to attract bedbugs. The device is constructed to provide a trap interior and an insect opening to access the trap interior. The interior of the trap is provided with a lure composition in the form of one of readily available volatile or non-volatile chemical attractants or stimulants. In addition, diatomaceous earth can also be placed between the two plastic layers or combined with the volatile or non-volatile chemical attractants.

It is therefore an object of an embodiment of the present invention to provide a trap for bedbugs which mitigates at least some of the disadvantages of the prior art systems.

It is a further object of the present invention to provide an insect trap for destroying bedbugs by use of an attractant and diatomaceous earth combination which is non-toxic to man, plants, or animals but lethal to bedbugs.

Yet another object of the present invention is to provide a bedbug trap for the destruction of insects without adversely effecting the environment.

A further object of the present invention it to provide a trap for exterminating bedbugs while preserving a healthy environment.

Yet another embodiment of the present invention is to provide a trap for bedbugs that is effective yet simple, easy to use, and inexpensive.

These and other objects of the present invention will be fully realized when considered in conjunction with the accompanying drawings and following detailed description of the invention.

BRIEF DESCRIPTION OF THE SEVERAL
VIEWS OF THE DRAWINGS

Figure 4:
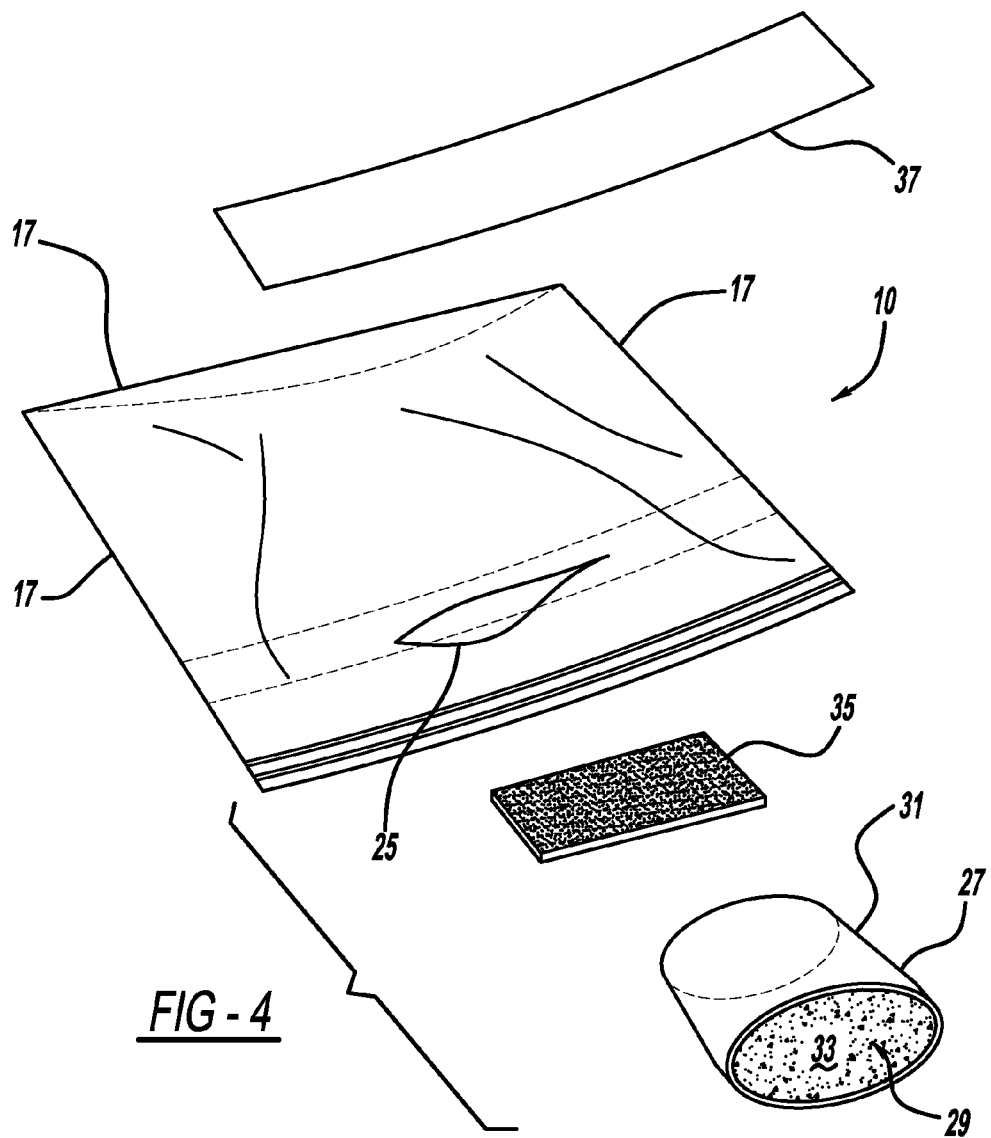

FIG. 1 is a perspective view of the invention;
FIG. 2 is a section view taken along lines 2-2 in FIG. 1;
FIG. 3 is a view in the direction of arrow 2 in FIG. 1; and
FIG. 4 is an exploded view of the several elements of the invention.

DETAILED DESCRIPTION OF THE PREFERRED
EMBODIMENT

The resurgence of bedbugs in North America in the recent past has presented some new challenges for pest control services as a result of the limited pesticide uses dictated by the environmental protection authorities and control agencies resulting in the stringent rules placed on the use of some chemicals that for years were used to control bedbugs. This has been particularly difficult in the hospitality industry as well as residential housing structures where many people reside, in that, typical chemical treatments using today's permissible pesticides requires multiple applications and are therefore expensive and are not as completely effective as in the past even when using multiple applications. The loss of business as a result of this recurring problem can be dramatic if a bedbug infestation is discovered.

The present invention is directed to a low cost apparatus 10 for the abatement of bedbugs. The apparatus 10 includes a pliable double layer container, in the form of a sealed pliable pouch 15, having a peripheral edge 17 sealed so as to create a single sealed compartment 19 between the double-ply layers. As is illustrated in the preferred embodiment, a portion of the periphery of the pliable container may have an access opening 21 to the interior compartment but this access opening 21 must be resealable so as to enable the creation of a single sealed compartment 19 between the pliable double-layer container. In the top layer 23 of the pliable container a small slit or opening 25 has been made to provide an opening for receiving an oval-shaped tubular member 27 having an entryway 29 which extends outward from the small slit 25 to allow communication with the environment surrounding the sealed pliable pouch 15. The opposite end of the oval-shaped tubular member 27 extends through the small slit 25 and communicates with the environment within the sealed pliable pouch 15. The small slit 25 in the top layer 23 of the sealed pliable pouch 15 should be just long enough so that after the oval-shaped tubular member 27 is pushed through the small slit 25, the peripheral surface of the oval-shaped tubular member 27 and the pliable material of the sealed pliable pouch 15 create a seal about the periphery of the oval-shaped tubular member 27. The oval-shaped tubular member 27 may be of any convenient cross-sectional shape and can be made from a variety of materials, i.e. cloth, plastic, stiff paper, etc. The preferred embodiment illustrates a tapered body 31 in the form of a funnel such that the opening at the opposite end of the oval-shaped tubular member 27 is smaller than the entryway opening. The inside surface 33 of the oval-shaped tubular member 27 is preferably made with a textured surface to facilitate the bedbug as it enters the trap.

The bedbugs are attracted into the trap by providing within the trap a lure composition in the form of one of the readily available off-the-shelf volatile or non-volatile chemical attractants or stimulants 35. The attractant 35 can be placed within the trap by depositing the attractant 35 in the entryway 29 of the oval-shaped tubular member 27 and then holding the oval-shaped tubular member 27 in a vertical upright position to drop the attractant 35 into the sealed pliable pouch 15. Alternatively, the access opening 21 along the peripheral edge 17 of the sealed pliable pouch 15 can be used to permit the user to drop the attractant 35 into the sealed pliable pouch 15 and thereafter the access opening 21 can be closed and resealed. If the invention is marketed as a single complete product, that is, the trap with the attractant 35 contained in the sealed pliable pouch 15 it will be necessary to provide a further seal 37 that is placed on the top layer 23 of the double-layer pouch so that the entryway 29 is sealed to prevent any of the attractant 35 from being accidentally spilled out of the interior of the sealed pliable pouch 15 through the oval-shaped tubular member 27. This seal is removed before the trap is placed in use to attract bedbugs.

In addition to the attractant 35 that is placed within the sealed compartment, an additional insecticide that can be placed within the sealed compartment along with the attractant 35 is diatomaceous earth which physically rather than chemically kills the bedbugs. Diatomaceous earth is fossilized remains of microscopic shells and a known desiccant. Thus, diatomaceous earth kills bedbugs by dehydration.

After the attractant 35 is placed within the sealed pliable pouch 15 and the access opening 21 is properly sealed the trap is ready for use wherever bedbugs are present. The seal 37 on the top layer 23 of the sealed pliable pouch 15 is removed and the trap is placed near the infested area with the top layer 23 containing the oval-shaped tubular member 27 facing upwards. In a bedroom, the trap maybe placed between the sheets of the bed or between a mattress and a mattress cover. The bedbugs will be drawn to the attractant 35 and enter the trap through the oval-shaped tubular member 27 into the single sealed compartment 19 and thereafter remain in the single sealed compartment 19 because they will be unable to find an outlet. Also, the surface texture of the inner sealed compartment 19 will be smooth as compared to the inner surface 33 of the oval-shaped tubular member 27 to make it more difficult to maneuver within the single sealed compartment 19.

After use, the trap is easily collected and either completely discarded or alternatively, the attractant 35 and dead bedbugs can be removed from the single sealed compartment 19 through the access opening 21. The single sealed compartment 19 can be rinsed out and dried. Thereafter, fresh attractant 35 can be placed in the single sealed compartment 19 through the access opening 21 and after resealing the access opening 21 the trap is ready for further use.

The invention has been described in detail with respect to the preferred embodiment for the entrapment of bedbugs. The trap can also be used to trap other insects. It will be apparent that the invention is capable of numerous modifications and variations such as for use as a mousetrap, to those skilled in the art without departing from the spirit and scope of the invention as defined in the following claims.

What is claimed is:

1. An insect trap comprising:
   a base layer having a continuous peripheral edge;
   a top layer contiguous to said base layer, said top layer having a continuous peripheral edge;
   means for sealing said continuous peripheral edge of said base layer to said continuous peripheral edge of said top layer defining an inner sealed compartment between said top layer and said base layer;
   a predetermined opening slit in one of said base layer and said top layer; and
   an inlet member mounted in said predetermined opening slit of said one of said base layer and said top layer, said inlet member having an inner surface and an outer surface whereby insects entering said inlet member using said inner surface gain access to said inner sealed compartment of said insect trap and are unable to exit therefrom.

2. The insect trap as claimed in claim 1 wherein said means for sealing further comprises a portion of said inner sealed compartment having an opening with a resealable edge so as to enable temporary access to said inner sealed compartment.

3. The insect trap as claimed in claim 1 further comprising an insect attractant located within said inner sealed compartment.

4. The insect trap as claimed in claim 2 further comprising an insect attractant located within said inner sealed compartment.

5. The insect trap as claimed in claim 1 further comprising an adhesive tape member having one end applied to the outer surface of said inlet member and an opposing end applied to the surface layer of one of said base layer and said top layer surrounding said predetermined opening slit whereby said adhesive tape seals said opening slit surrounding said inlet member.

6. An insect trap comprising:
   a base layer having
      an inner surface;
      an outer surface opposite said inner surface; and
      a continuous peripheral edge;
   a top layer having
      an inner surface;
      an outer surface opposite said inner surface; and
      a continuous peripheral edge;
   said top layer being disposed contiguous said base layer;
   means for sealing said continuous peripheral edge of said base layer to said continuous peripheral edge of said top layer, said sealing means defining an inner sealed compartment between said inner surface of said base layer and said inner surface of said top layer;
   a predetermined opening slit in one of said base layer and said top layer;
   an inlet member mounted in said predetermined opening slit of said one of said base layer and said top layer, said inlet member having an inner surface and an outer surface;
   an insect attractant located within said inner sealed compartment whereby insects entering said inlet member using said inner surface of said inlet member gain access to said attractant in said inner sealed compartment of said insect trap and are unable to exit therefrom.

7. The insect trap as claimed in claim 6 wherein said means for sealing further comprises a portion of said inner sealed compartment having an opening with a resealable edge so as to enable temporary access to said inner sealed compartment.

8. The insect trap as claimed in claim 6 further comprising an adhesive tape member having one end applied to the outer surface of said inlet member and an opposing end applied to the surface layer of one of said base layer and said top layer surrounding said predetermined opening slit whereby said adhesive tape seals said opening slit surrounding said inlet member.

* * * * *